US012768807B2

(12) United States Patent
Iwamoto et al.

(10) Patent No.: US 12,768,807 B2
(45) Date of Patent: Oct. 20, 2026

(54) IONIC-LIQUID-CONTAINING POLYMER

(71) Applicant: HORIBA Advanced Techno, Co., Ltd., Kyoto (JP)

(72) Inventors: Yasukazu Iwamoto, Kyoto (JP); Manabu Shibata, Kyoto (JP); Koji Ueda, Kyoto (JP); Guillaume Jacques Bouilly, Kyoto (JP); Kohei Tsuji, Kyoto (JP)

(73) Assignee: HORIBA Advanced Techno, Co., Ltd., Kyoto (JP)

( * ) Notice: Subject to any disclaimer, the term of this patent is extended or adjusted under 35 U.S.C. 154(b) by 372 days.

(21) Appl. No.: 17/801,760

(22) PCT Filed: Feb. 26, 2021

(86) PCT No.: PCT/JP2021/007412
§ 371 (c)(1),
(2) Date: Aug. 23, 2022

(87) PCT Pub. No.: WO2021/177178
PCT Pub. Date: Sep. 10, 2021

(65) Prior Publication Data
US 2023/0110700 A1 Apr. 13, 2023

(30) Foreign Application Priority Data
Mar. 3, 2020 (JP) ................................ 2020-035801

(51) Int. Cl.
*G01N 27/30* (2006.01)
*G01N 27/04* (2006.01)
(Continued)

(52) U.S. Cl.
CPC .......... *G01N 27/301* (2013.01); *G01N 27/04* (2013.01); *G01N 27/308* (2013.01);
(Continued)

(58) Field of Classification Search
CPC .... G01N 27/301; G01N 27/04; G01N 27/308; G01N 27/3335; G01N 27/302; G01N 27/414
See application file for complete search history.

(56) References Cited

U.S. PATENT DOCUMENTS

2009/0283404 A1 11/2009 Kakiuchi et al.
2012/0073990 A1* 3/2012 Arimoto ................ G01N 27/42 205/789
(Continued)

FOREIGN PATENT DOCUMENTS

CN 101523201 A 9/2009
CN 109946362 A 6/2019
(Continued)

OTHER PUBLICATIONS

Kagimoto et al., "Hydrophobic and low-density amino acid ionic liquids," 2009, Journal of Molecular Liquids, vol. 153, pp. 133-138 (Year: 2009).*
(Continued)

*Primary Examiner* — Shizhi Qian
(74) *Attorney, Agent, or Firm* — Alleman Hall LLP

(57) ABSTRACT

Provided is an ionic-liquid-containing polymer capable of further downsizing a comparison electrode or the like and further improving the degree of freedom in design while reducing the manufacturing cost. The ionic-liquid-containing polymer used as a salt bridge of the comparison electrode contains an adhesive and a hydrophobic ionic liquid.

7 Claims, 6 Drawing Sheets

(51) Int. Cl.
*G01N 27/333* (2006.01)
*G01N 27/414* (2006.01)

(52) U.S. Cl.
CPC ....... *G01N 27/3335* (2013.01); *G01N 27/302* (2013.01); *G01N 27/414* (2013.01)

(56) References Cited

U.S. PATENT DOCUMENTS

| | | | | |
|---|---|---|---|---|
| 2014/0158536 | A1 | 6/2014 | Thompson et al. | |
| 2015/0338367 | A1* | 11/2015 | Hu | G01N 27/308 205/780 |
| 2019/0195824 | A1* | 6/2019 | Speck | G01N 27/301 |

FOREIGN PATENT DOCUMENTS

| | | | | |
|---|---|---|---|---|
| JP | 2009156836 | A | 7/2009 | |
| JP | 2012520462 | A | 9/2012 | |
| JP | 2014062782 | A | 4/2014 | |
| JP | 2018009819 | A | 1/2018 | |
| WO | 2008032790 | A1 | 3/2008 | |
| WO | 2010104962 | A | 9/2010 | |
| WO | 2012114389 | A1 | 8/2012 | |
| WO | WO-2017130218 | A1 * | 8/2017 | G01N 27/301 |
| WO | 2021096933 | A1 | 5/2021 | |

OTHER PUBLICATIONS

Avantor, “FS1-3730 Fluorosilicone adhesive/sealant,” 2018, Avantor, pp. 1-2 (Year: 2018).*

Chen, “Development of Electrochemical Sensors for Analytical and Biomedical Applications,” 2019, University of Minnesota, pp. 1-257 (Year: 2019).*

Liu et al., “Synthesis and characterization of a novel fluorosilicone resin based on trifluoropropylalkoxylsilane,” 2019, Materials Chemistry and Physics, vol. 224, pp. 40-46 (Year: 2019).*

ISA Japan Patent Office, International Search Report Issued in Application No. PCT/JP2021/007412, Apr. 27, 2021, WIPO, 4 pages.

European Patent Office, Extended European Search Report Issued in Application No. 21765317.9, Feb. 6, 2024, 9 pages.

Cicmil, D. et al., “Ionic Liquid-Based, Liquid-Junction-Free Reference Electrode,” Electroanalysis, vol. 23, No. 8, Aug. 4, 2011, 10 pages.

China National Intellectual Property Administration, Office Action and Search Report Issued in Application No. 202180015798.5, Jul. 25, 2024, 19 pages.

* cited by examiner

IONIC-LIQUID-CONTAINING POLYMER

TECHNICAL FIELD

The present invention relates to an ionic-liquid-containing polymer used as a salt bridge of a comparison electrode or the like.

BACKGROUND ART

Conventionally, as described in Patent Literature 1, there is known an ionic-liquid-containing polymer that is used as a salt bridge for a comparison electrode containing a gelled hydrophobic ionic liquid (hereinafter also referred to as IL), and hardly causes evaporation or outflow of an electrolyte by utilizing a property of the hydrophobic ionic liquid.

However, when the conventional ionic-liquid-containing polymer is attached to, for example, a silver/silver chloride electrode of a comparison electrode, it is necessary to attach the ionic-liquid-containing polymer using a separately prepared adhesive, fastener, or the like. Therefore, when the comparison electrode is further downsized or the comparison electrode has a special shape, there is a problem that the manufacturing cost of the comparison electrode increases.

CITATION LIST

Patent Literature

Patent Literature 1: WO 2008/032790 A

SUMMARY OF INVENTION

Technical Problem

The present invention has been made in view of the above-described problems, and an object of the present invention is to provide an ionic-liquid-containing polymer capable of further downsizing a comparison electrode or the like, and further improving the degree of freedom in design while reducing the manufacturing cost.

Solution to Problem

That is, the ionic-liquid-containing polymer according to the present invention is an ionic-liquid-containing polymer used as a salt bridge of a comparison electrode, and includes an adhesive and a hydrophobic ionic liquid.

With use of such an ionic-liquid-containing polymer, it is possible to impart adhesiveness to the ionic-liquid-containing polymer itself while utilizing the properties of the hydrophobic ionic liquid.

As a result, for example, even when the comparison electrode is further downsized compared with conventional ones or has a special shape, the ionic-liquid-containing polymer can be directly stuck to a portion where the ionic-liquid-containing polymer is required without using a separately prepared adhesive, fastener, or the like, so that it does not take time and effort to manufacture the comparison electrode or the like, and the manufacturing cost can be reduced.

Furthermore, since the ionic-liquid-containing polymer itself has adhesiveness, the adhesion between the silver/silver chloride electrode and the ionic-liquid-containing polymer can be improved and the potential of the comparison electrode or the like can be further stabilized as compared with the conventional case of attachment using a separately prepared adhesive or fastener.

As a specific embodiment of the present invention, the adhesive may be an epoxy-based or silicon-based synthetic resin-based adhesive.

When the adhesive contains a fluorine atom, compatibility between the adhesive and the hydrophobic ionic liquid can be further improved particularly when a polar group such as a fluorine atom is contained in the hydrophobic ionic liquid.

A method for manufacturing an ionic-liquid-containing polymer includes mixing and drying an adhesive and a hydrophobic ionic liquid.

Since the method for manufacturing the ionic-liquid-containing polymer is very simple in operation, the manufacturing cost of the ionic-liquid-containing polymer itself can also be kept low.

Advantageous Effects of Invention

According to the present invention, it is possible to impart adhesiveness to the ionic-liquid-containing polymer itself while utilizing the properties of the hydrophobic ionic liquid that hardly evaporates and hardly allows the electrolyte to flow out.

Accordingly, when the ionic-liquid-containing polymer is attached, it is not necessary to use an adhesive, a fastener or the like prepared separately, and it is possible to reduce time and effort for manufacturing a comparison electrode or the like, and the number of parts.

As a result, it is possible to achieve both further downsizing of the comparison electrode or the like and improvement of the degree of freedom in shape, and low cost.

Further, since the ionic-liquid-containing polymer itself has adhesiveness, the adhesion between the electrode and the ionic-liquid-containing polymer can be improved and the potential of the comparison electrode or the like can be further stabilized as compared with the conventional case of attachment using an adhesive separately prepared.

Furthermore, since the ionic-liquid-containing polymer contains the adhesive, it is possible to improve flexibility as compared with the conventional gelled ionic liquid.

As a result, it is also possible to make the comparison electrode containing the ionic-liquid-containing polymer flexible enough to flexibly adapt to a shape change such as bending.

LIST OF REFERENCE CHARACTERS

4 ionic-liquid-containing polymer
22 work electrode (ion-selective electrode)
23 comparison electrode

DESCRIPTION OF EMBODIMENTS

Hereinafter, one embodiment of the present invention will be described with reference to the drawings.

The ionic-liquid-containing polymer according to the present embodiment is used in an electrochemical measurement device such as a multi-ion sensor type ion concentration measurement device capable of simultaneously measuring concentrations, electric conductivities and the like of a plurality of types of ions.

Figure 1:
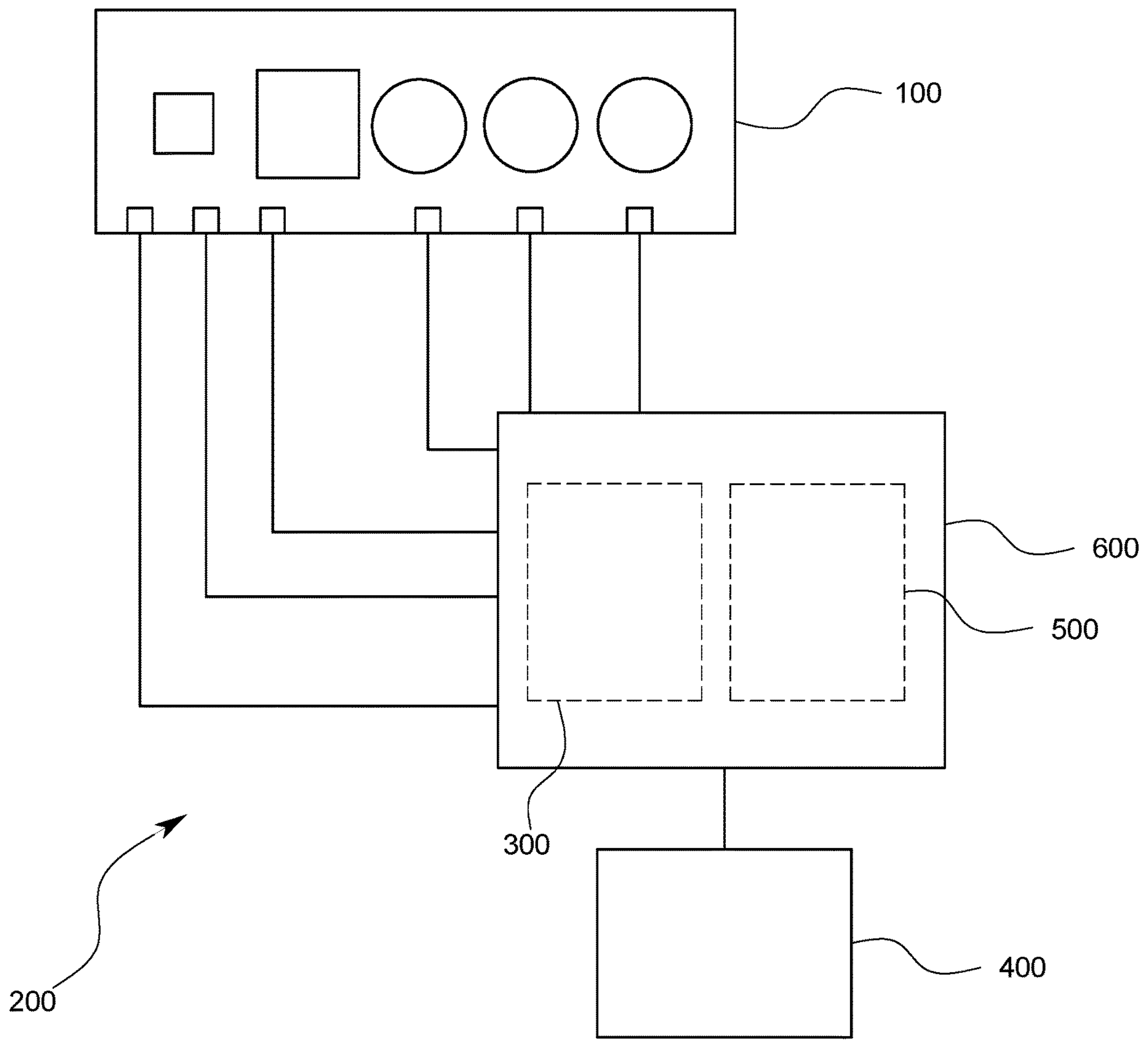
FIG. 1 is a schematic diagram illustrating an ion concentration measurement device according one embodiment of the present invention.

For example, as illustrated in FIG. 1, an ion concentration measurement device 200 includes a sensor unit 100 that comes into contact with a sample solution and detects ions and the like contained in the sample solution, a calculation unit 300 that calculates an ion concentration and the like based on an output value output from the sensor unit 100, a display unit 400 that displays a measurement value and the like calculated by the calculation unit 300, and a control unit 500 that controls the calculation unit 300 and the display unit 400.

Figure 2A:
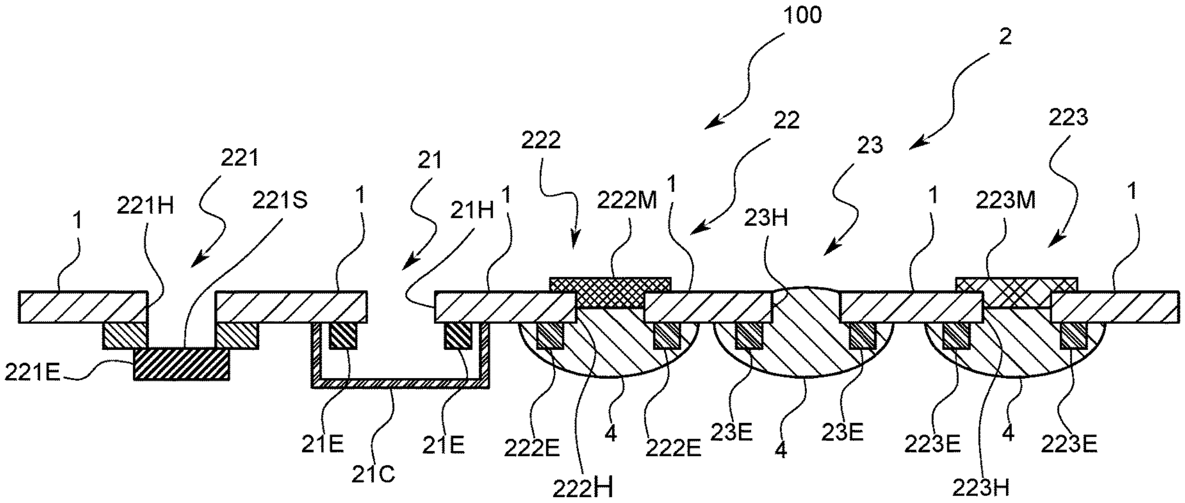
FIGS. 2(*a*) and 2(*b*) are schematic diagrams illustrating a sensor unit according one embodiment of the present invention.
Figure 2B:
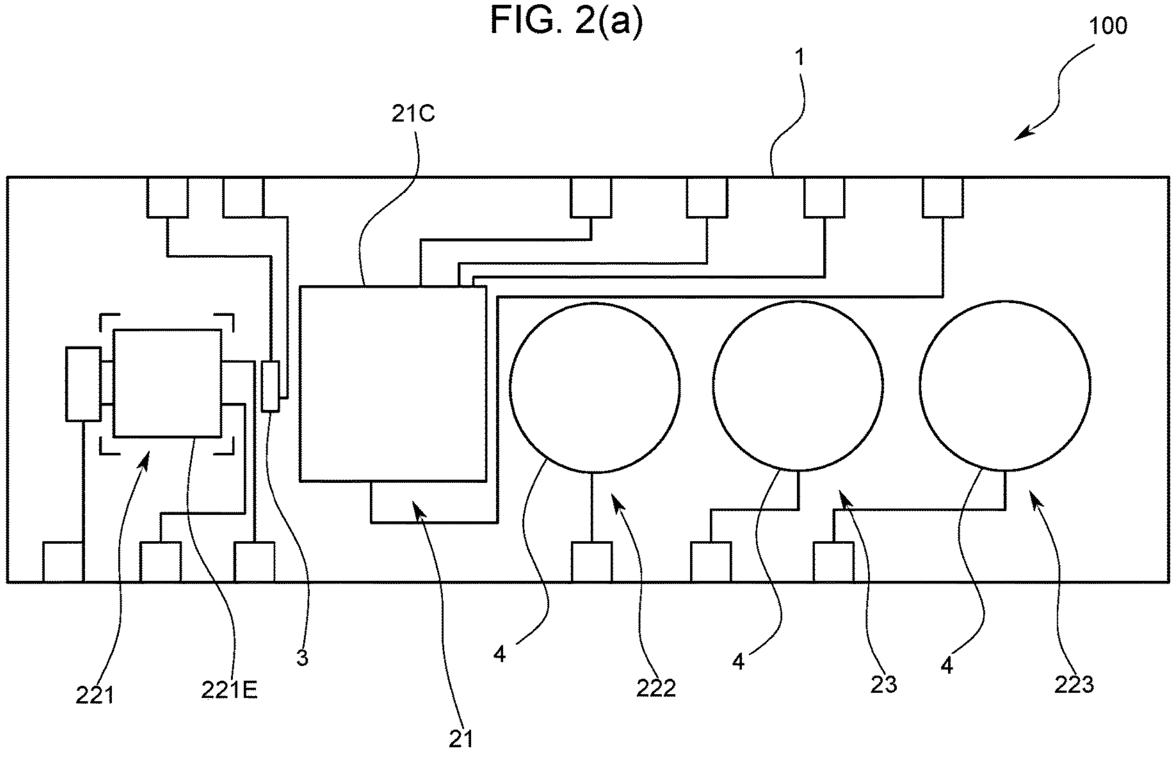

For example, as illustrated in FIGS. 2(*a*) and 2(*b*), the sensor unit 100 includes a film-like base material 1 made of a liquid crystal polymer, polyvinyl chloride, polyethylene terephthalate or the like and having a length of 3 cm, a width of 1 cm, and a thickness of about 0.5 mm, an electrode unit 2 and a thermistor 3 provided on the base material 1, and the like. FIG. 2(*a*) is a schematic diagram illustrating an end surface of the sensor unit 100, and FIG. 2(*b*) is a schematic diagram illustrating a surface of the sensor unit 100 opposite to the surface that comes into contact with the sample solution.

In this embodiment, an information processing circuit 600 provided separately from the sensor unit 100 acts a role of the calculation unit 300, the display unit 400, and the control unit 500.

The information processing circuit 600 includes a digital circuit made up of a CPU, a memory, a communication port, and the like, an analog circuit including a buffer, an amplifier, and the like, and an AD converter, a DA converter, and the like that mediate the digital circuit and the analog circuit. Then, the CPU and its peripheral devices cooperate in accordance with a predetermined program stored in the memory, so that the information processing circuit 600 functions as the calculation unit 300, the display unit 400, and the control unit 500.

Hereinafter, the electrode unit 2 will be described in detail.

The electrode unit 2 includes, for example, an electrical conductivity meter 21, an ion-selective electrode 22 that is a work electrode, a comparison electrode 23, and the like, each of which is connected to the information processing circuit 600 by a printed wire formed on the base material 1.

The electric conductivity meter 21 includes a through hole 21H for an electric conductivity meter formed in the base material 11, two electrodes 21E attached to a surface of the base material 1 on a side opposite to a surface that comes into contact with the sample solution so as to interpose the through hole 21H for the electrical conductivity meter, and a housing 21C for receiving the sample solution and formed so as to cover the two electrodes.

In this embodiment, for example, the ion-selective electrode 22 is a pH electrode 221 for measuring a hydrogen ion concentration in a sample solution, a sodium ion-selective electrode 222 for measuring a sodium ion concentration, and a potassium ion-selective electrode 223 for measuring a potassium ion concentration.

The pH electrode 221 includes a pH electrode through hole 221H formed in the base material 1 and an ISFET electrode 221E, and the ISFET electrode 221E is attached to a surface of the base material 1 opposite to a surface that comes into contact with the sample solution such that an ion sensitive membrane 221S of the ISFET electrode 221E comes into in contact with the sample solution via the pH electrode through hole 221H.

The sodium ion-selective electrode 222 includes a through hole 222H for a sodium ion-selective electrode formed in the base material 1, an ion sensitive membrane 222M attached so as to close the through hole 222H for a sodium ion-selective electrode, an internal electrode 222E attached to a surface of the base material 1 on a side opposite to a surface that comes into contact with the sample solution and made of a silver/silver chloride electrode or the like, and a gel-like internal liquid attached to the base material 1 so as to cover the internal electrode 222E and to be in contact with both the internal electrode 222E and the ion sensitive membrane 222M.

The potassium ion-selective electrode 223 includes a through hole 223H for a potassium ion-selective electrode formed in the base material 1, an ion sensitive membrane 223M attached so as to close the through hole 223H for a potassium ion-selective electrode, an internal electrode 223E attached to a surface of the base material 1 on a side opposite to a surface that comes into contact with the sample solution and made of a silver/silver chloride electrode or the like, and a gel-like internal liquid attached to the base material 1 so as to cover the internal electrode 223E and to be in contact with both the internal electrode 223E and the ion sensitive membrane 223M.

The comparison electrode 23 functions as a reference electrode of the ion-selective electrode 22, and includes a through hole 23H for a comparison electrode formed in the base material 1, an internal electrode 23E attached to a surface of the base material 1 of the base material 1 on a side opposite to a surface that comes into contact with the sample solution and made of a silver/silver chloride electrode or the like, and an ionic-liquid-containing polymer 4 attached to the base material 1 so as to cover the internal electrode 23E and the through hole 23H for a comparison electrode.

The ionic-liquid-containing polymer 4 contains an adhesive and a hydrophobic ionic liquid.

As the adhesive, one or more selected from polyvinyl chloride (PVC), polystyrene, acrylate, polyvinyl butyral, polyamide, polyimide, polyurethane, polytetrafluoroethylene (PTFE), polysiloxane, a copolymer of vinylidene fluoride and hexafluoropropylene (PVDF-HFP), and fluoropolysiloxane are preferably used. These may be used alone or in combination of two or more kinds thereof.

As one example of the adhesive, fluoropolysiloxane is used in this embodiment. As one example of the hydrophobic ionic liquid, $[C_{8mim}][C_1C_1N]$ is used in this embodiment.

The ionic-liquid-containing polymer 4 can be manufactured by mixing a predetermined amount of the adhesive and the hydrophobic ionic liquid.

In this embodiment, for example, the ionic-liquid-containing polymer 4 is manufactured by adding fluoropolysiloxane as the adhesive to $[C_{8mim}][C_1C_1N]$ as the hydrophobic ionic liquid together with, for example, an appropriate solvent such as tetrahydrofuran so that the ratio of the hydrophobic ionic liquid to the adhesive is 1:1 in terms of weight ratio, and well mixing the mixture.

The ionic-liquid-containing polymer 4 manufactured in such a way is applied to, for example, a silver/silver chloride electrode that is an internal electrode, and dried for use as a salt bridge of the comparison electrode 23, for example.

With use of the ionic-liquid-containing polymer 4 configured as described above and the ion concentration measurement device 200 containing the same, the following effects can be achieved.

Since the ionic containing polymer contains $[C_{8mim}]$ $[C_1C_1N]$ as a hydrophobic ionic liquid, when the ionic containing polymer is used as a salt bridge of the comparison electrode 23 as described in the embodiment, the elution rate of the ionic-liquid-containing polymer 4 into a sample solution can be reduced to be very low, and contamination of the sample solution can be inhibited.

Further, since the ionic liquid has a property of very low volatility, it is not necessary to design in consideration of volatilization of the ionic-liquid-containing polymer 4, and the configuration of the comparison electrode 23 can be simplified and the comparison electrode 23 can be further downsized.

Furthermore, since the ionic-liquid-containing polymer 4 contains fluoropolysiloxane as the adhesive, the ionic-liquid-containing polymer 4 itself can have sufficient adhesiveness.

As a result, when the ionic-liquid-containing polymer 4 is attached to the comparison electrode 23, it is not necessary to use an adhesive, a fastener or the like prepared separately, and it is possible to reduce time and effort for manufacturing the comparison electrode 23 or the like, and the number of parts.

Accordingly, it is possible to achieve both further downsizing of the comparison electrode 23 or improvement of the degree of freedom in shape and low cost.

Since the ionic-liquid-containing polymer 4 itself has adhesiveness, the adhesion between the electrode and the ionic-liquid-containing polymer 4 can be improved and the potential of the comparison electrode 23 or the like can be further stabilized as compared with the conventional case of attachment using an adhesive separately prepared.

Although this is merely a presumption, it is considered that since both the adhesive and the hydrophobic ionic liquid have a fluorine atom, the adhesive and the hydrophobic ionic liquid are easily compatible with each other and are difficult to be separated.

As described above, since the ionic-liquid-containing polymer 4 has very low volatility and does not need to be accommodated in a housing that prevents the internal liquid from being evaporated, it is possible to further downsize the sodium ion-selective electrode 222 and the potassium ion-selective electrode 223 than conventional ones.

Since the ionic-liquid-containing polymer 4 contains the adhesive, it is also possible to improve flexibility as compared with the conventional gelled ionic liquid.

As a result, it is possible to make the ion concentration measurement device 200 including the comparison electrode 23 flexible enough to flexibly adapt to a shape change such as bending or twisting.

Since the comparison electrode 23 can be made flexible as described above, for example, the sensor unit 100 may be a wearable multi-sensor unit that can be used by directly wearing on the skin of a person or the like.

Such a sensor unit 100 can also be used for, for example, applications for measuring a trace amount of sample such as a biological sample or a soil component.

Further, owing to ease of manufacture, the manufacturing cost of the comparison electrode can be reduced to obtain a disposable comparison electrode.

The present invention is not limited to the above-described embodiments.

For example, the adhesive is not particularly limited as long as the adhesive has a certain degree of adhesive force, and it is sufficient that the adhesive is mixed with the hydrophobic ionic liquid without phase separation.

The adhesive may be, for example, a natural rubber-based adhesive or a synthetic resin-based adhesive. Examples of the synthetic resin-based adhesive include an acrylic adhesive, an olefin-based adhesive, a urethane-based adhesive, a silicon-based adhesive, a vinyl chloride-based adhesive, an epoxy-based adhesive, a polyamide-based adhesive, and a polyimide-based adhesive. As the adhesive, one selected from these adhesives may be used, or two or more of these adhesives may be used in combination.

In particular, an epoxy-based adhesive or a silicon-based adhesive is easily mixed with the hydrophobic ionic liquid and is easy to use.

Examples of the hydrophobic ionic liquid include an ionic liquid in which the hydrophobic ionic liquid is formed of cations and anions having substantially the same magnitude of ionic liquid-water transfer standard Gibbs energy.

The ionic liquid-water transfer standard Gibbs energy means Gibbs (free) energy required for cations or anions that constitute an ionic liquid to transfer between the ionic liquid and water in a standard state (0.1 MPa, 25° C.).

Further, the same magnitude of the energy may be substantially the same order of magnitude. The hydrophobic ionic liquid refers to a liquid in which the sum of the ionic liquid-water transition Gibbs energy of cations and anions that constitute the ionic liquid is about 30 kJ/mol or less in the standard state. An ionic liquid meeting this condition is one kind of poorly soluble salt that is poorly soluble in water.

Specific examples of cations and anions having substantially the same magnitude of ionic liquid-water transfer standard Gibbs energy include the following.

Examples of the cation include at least one of a quaternary ammonium cation, a quaternary phosphonium cation, or a quaternary arzonium cation, and more specifically, at least one of $(C_2H_5)_4N+$, $C_{imim}$(1-alkyl-3-methylimidazolium ion (i represents the number of carbon atoms of the alkyl group) such as $C_{4mim}^+$, $C_{6mim}^+$, $C_{8mim}^+$, or $C_{10mim}^+$, $(n\text{-}C_3H_7)_4N^+$, $(n\text{-}C_4H_9)_4N^+$, and $Ph_4As^+$.

Examples of the anion include at least one of $[R'SO_2NSO_2R^2]$—($R^1$ and $R^2$ are each a perfluoroalkyl group having 1 to 12 carbon atoms), borate ions containing fluorine, such as $C_2F_5BF_3^-$, $C_3F_7BF_3^-$, and $C_4F_9BF_3^-$, $B(CN)_4$" (tetracyanoborate), $BEHS_5^-$ (bis(2-ethylhexyl) sulfosuccinate), $C_1C_1N^-$ (bis(trifluoromethylsulfonyl)imide ion), $P(C_nF2_{n+1})_3F_3^-$ (wherein n is 1 to 6, and the same applies hereinafter), $(CF_3SO_2)_3C^-$, $AsF_6^-$, $SbF_6^-$, $(C_nF_{2n+1})SO_3^-$, and $(CnF_{2n+1})COO^-$.

Such a hydrophobic ionic liquid including cations and anions can be appropriately selected and used according to the application.

The ionic-liquid-containing polymer 4 may be a mixture of the adhesive and the hydrophobic ionic liquid at a weight ratio of 100:10 to 10:300, more preferably about 100:50 to 100:200, and an appropriate solvent may be used for mixing them well.

A plasticizer such as dioctyl phthalate (n-DOP) may be added to the ionic-liquid-containing polymer 4 if necessary.

The comparison electrode 23 may further include an ion-electron conversion layer 6 that mediates electrical connection between the ionic-liquid-containing polymer 4 and the internal electrode 23E, 222E, or 223E by electronic conduction between the ionic-liquid-containing polymer 4 used as the salt bridge and the internal electrode 23E. As one example, FIG. 5 illustrates a comparison electrode including the ion-electron conversion layer 6.

Figure 5:
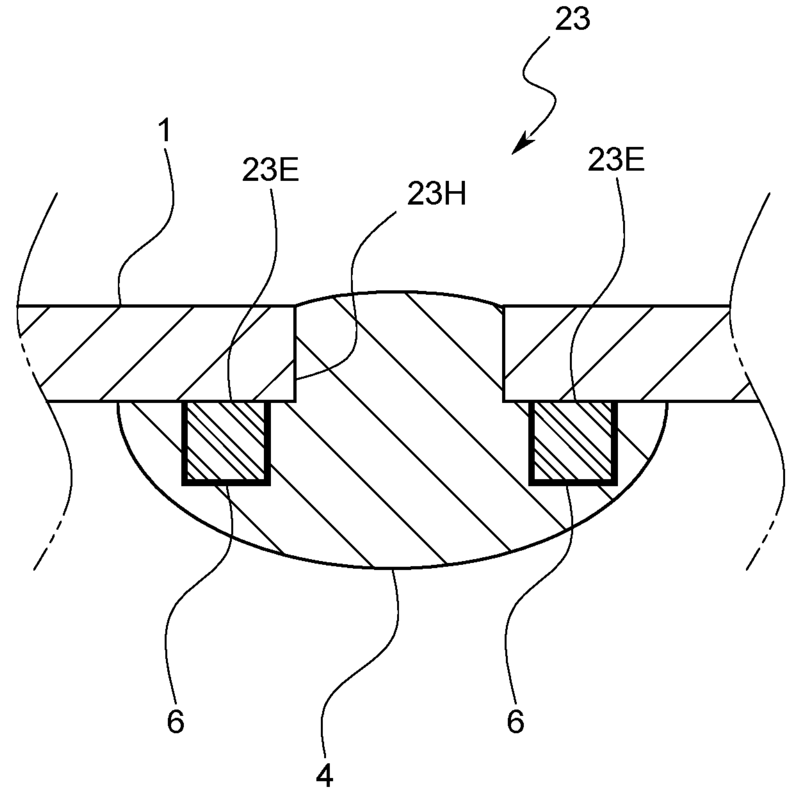
FIG. 5 is a schematic end view illustrating a comparison electrode according to another embodiment of the present invention.

In this case, for example, as illustrated in FIG. 5, the ion-electron conversion layer 6 preferably covers the entire surface of the internal electrode 23E on the sample solution side, and the entire surface of the ion-electron conversion layer 6 on the sample solution side is preferably covered with the ionic-liquid-containing polymer 4. In this way, moisture or the like can be inhibited from entering between the ionic-liquid-containing polymer 4 and the ion-electron conversion layer 6 or between the ion-electron conversion layer 6 and the internal electrode 23E.

The ion-electron conversion layer 6 contains one or more components capable of converting ions and electrons, such as carbon nanotubes, graphene, or graphite.

When the ion-electron conversion layer 6 is provided between the ionic-liquid-containing polymer 4 and the internal electrode 23E as described above, as illustrated in FIGS. 6(*a*) and 6(*b*), it is possible to further enhance electrical adhesion as compared with the case where the ionic-liquid-containing polymer 4 is in direct contact with the internal electrode 23E.

Figure 6A:
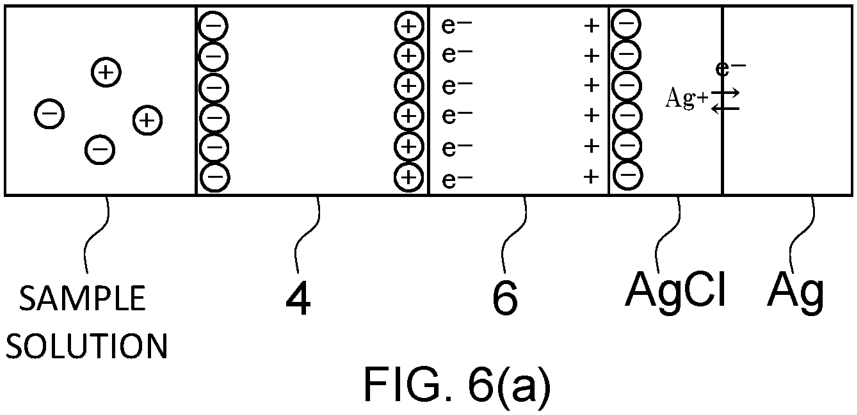
FIGS. 6(*a*) and 6(*b*) are views illustrating schematic diagrams of ion-electron conversion in each comparison electrode of the present invention.
Figure 6B:
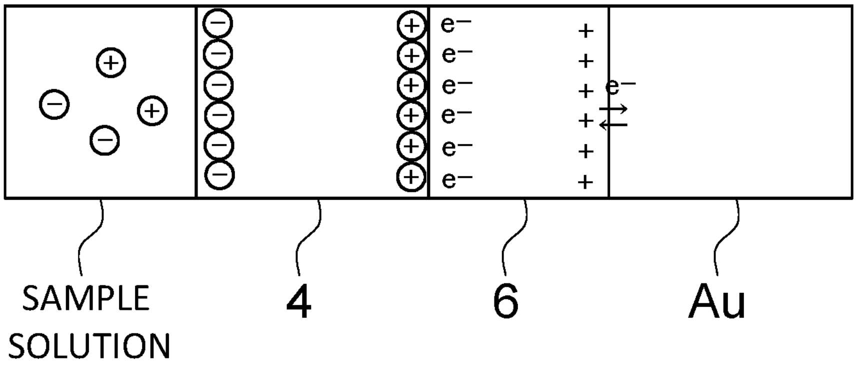

In the above embodiment, as illustrated in FIG. 6(*a*), the internal electrode is made of silver/silver chloride, but as illustrated in FIG. 6(*b*), when the internal electrode is made of a metal such as gold or platinum, since the ion-electron conversion between the ion-electron conversion layer 6 and the internal electrode can be omitted, it is possible to further improve the response speed.

The sodium ion-selective electrode 222 or the potassium ion-selective electrode 223 may further contain, for example, an internal liquid such as a 3.3 mol/L KCl aqueous solution and a housing that accommodates the internal liquid.

As the ion-selective electrode 22, in addition to the pH electrode 221, the sodium ion-selective electrode 222, and the potassium ion-selective electrode 223 described above, an electrode that detects the concentration of other types of ions may be used, or a plurality of electrodes that detect the concentration of the same type of ions or the concentration of different types of ions may be freely combined and used.

In addition, various modifications and combinations of embodiments may be made without departing from the spirit of the present invention.

EXAMPLES

Hereinafter, the ionic-liquid-containing polymer 4 according to the present invention will be described in more detail with reference to examples, but the present invention is not limited to these examples.

Example 1

In this example, various ionic-liquid-containing polymers 4 were prepared by changing the types and blending ratios of the hydrophobic ionic liquid and the adhesive, and properties of the ionic-liquid-containing polymers 4 were compared with gelled conventional ionic liquids. Note that for each of these samples, four samples having the same composition were prepared by the same procedure.

The following Table 1 illustrates the composition of the ionic-liquid-containing polymer 4 prepared in the present example. In Table 1, ionic liquid 1 is $[C_{8mim}][C_1C_1N]$, 475.47 g/mol, Matrix R is polyvinyl chloride (average polymerization degree: 2500), Matrix A is RTV silicone rubber SE 9176 (Shin-Etsu Chemical Co., Ltd.), Matrix B is RTV silicone rubber FE 2000 (Shin-Etsu Chemical Co., Ltd.), Matrix C is EP-001K (Cemedine Co., Ltd.), and Matrix D is EP-008 (Cemedine Co., Ltd.).

Among these samples, R-1, R-2, and R-3 represent gelled conventional ionic liquids, and A-1, B-1, B-2, C-1, D-1, D-2, and D-3 represent the ionic-liquid-containing polymer 4 according to the present invention.

TABLE 1

| Sample name | R-1 | R-2 | R-3 | A-1 | B-1 | B-2 | C-1 | D-1 | D-2 | D-3 |
|---|---|---|---|---|---|---|---|---|---|---|
| Ionic liquid | 500 mg | 100 mg | 500 mg | 500 mg | 300 mg | 600 mg | 500 mg | 500 mg | 500 mg | 500 mg |
| Matrix R | 500 mg | 500 mg | 500 mg | — | — | — | — | — | — | — |
| Matrix A | — | — | — | 500 mg | — | — | — | — | — | — |
| Matrix B | — | — | — | — | 300 mg | 300 mg | — | — | — | — |
| Matrix C | — | — | — | — | — | — | 500 mg | — | — | — |
| Matrix D | — | — | — | — | — | — | — | 1000 mg | 500 mg | 500 mg |
| n-DOP | 1000 mg | 1000 mg | — | 200 mg | — | — | — | 200 mg | 1000 mg | — |
| THF | 10 ml | 10 ml | 10 ml | 0 ml | 1500 mg | 1500 mg | — | — | — | — |

Figure 3:
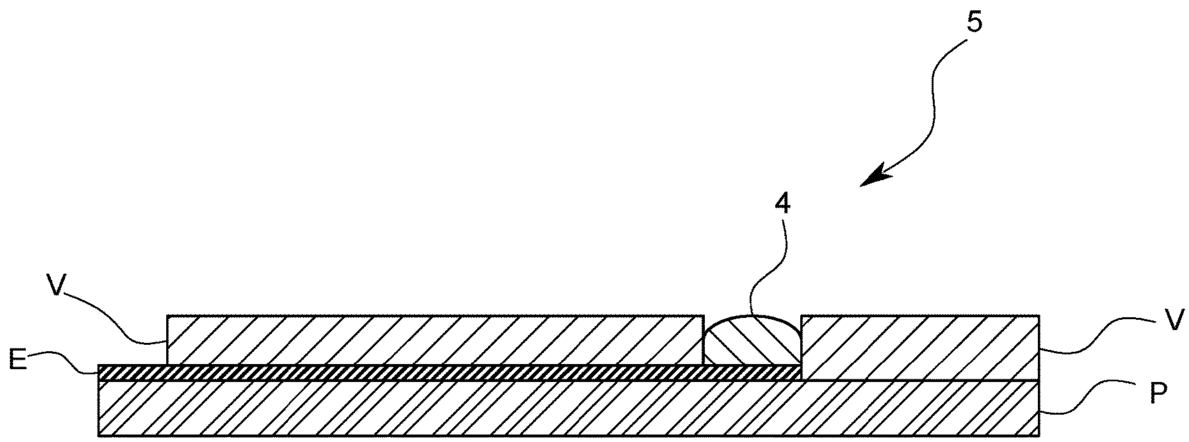
FIG. 3 is a schematic end view illustrating a comparison electrode according to one example of the present invention.

As illustrated in FIG. 3, each of the prepared samples in Table 1 was applied onto a silver/silver chloride electrode E of a card sensor 5 including the silver/silver chloride electrode E printed on a substrate P made of a liquid crystal polymer, and cured.

A method of producing the card sensor 5 is as follows.

First, a silver/silver chloride paste was applied to the substrate P made of the liquid crystal polymer and was dried overnight.

Next, a polyvinyl chloride plate V with a hole H having a diameter of 2 mm was stuck onto the substrate P with a double-sided tape such that the hole H was positioned on the silver/silver chloride electrode E.

To the portion of the hole H of the polyvinyl chloride plate V, 25 μl of each of the samples in Table 1 was dropped, and dried overnight.

The card sensor 5 produced in such a way was immersed in a 0.2 M KCl aqueous solution together with a silver wire, and the membrane resistance was measured using an electrical conductivity meter (DS-74, manufactured by HORIBA, Ltd.).

The following Table 2 summarizes the cured state and resistance value of these samples.

TABLE 2

| | | Sample name | | | | |
|---|---|---|---|---|---|---|
| Hardness | | R-1 Same level as conventional IL gel | R-2 Same level as conventional IL gel | R-3 Harder than conventional IL gel | A-1 Same level as conventional IL gel | B-1 Softer than conventional IL gel |
| Membrane resistance (Ω) | Sample 1 | 90K | 10M | 130K | 75K | 36K |
| | Sample 2 | 100K | 7M | 150K | 80K | 35K |
| | Sample 3 | 150K | 9M | — | 50K | — |
| | Sample 4 | 80K | 6M | — | 70K | — |

| | | Sample name | | | | |
|---|---|---|---|---|---|---|
| Hardness | | B-2 Sufficiently softer than conventional IL gel | C-1 Sufficiently softer than conventional IL gel | D-1 Sufficiently softer than conventional IL gel | D-2 Sufficiently softer than conventional IL gel | D-3 Softer than conventional IL gel |
| Membrane resistance (Ω) | Sample 1 | 9.2K | 25K | 200K | 75K | 500K |
| | Sample 2 | 9.2K | 24K | — | 80K | 120K |
| | Sample 3 | — | 30K | — | 50K | 200K |
| | Sample 4 | — | 28K | — | 70K | 120K |

From the results in Table 2, it was found that the ionic-liquid-containing polymer containing the adhesive and the hydrophobic ionic liquid had higher flexibility than the conventional ionic liquid gel does. Accordingly, it is considered that such an ionic-liquid-containing polymer 4 is less likely to be damaged when a flexible sheet-like electrode is formed.

Further, it was found that the ionic-liquid-containing polymer 4 containing the adhesive and the hydrophobic ionic liquid has a low and stable resistance value as compared with the conventional ionic liquid gel.

It was found that the higher the content rate of the hydrophobic ionic liquid, the lower the resistance value.

One of the factors contributing to the low and stable resistance value is considered to be that the adhesive and the hydrophobic ionic liquid are uniformly mixed without being separated.

Further, since the ionic-liquid-containing polymer 4 according to the present invention has adhesiveness, higher adhesion to the silver/silver chloride electrode E than that of a conventional ionic liquid gel is considered to be one of the factors of the low resistance value.

Figure 4:
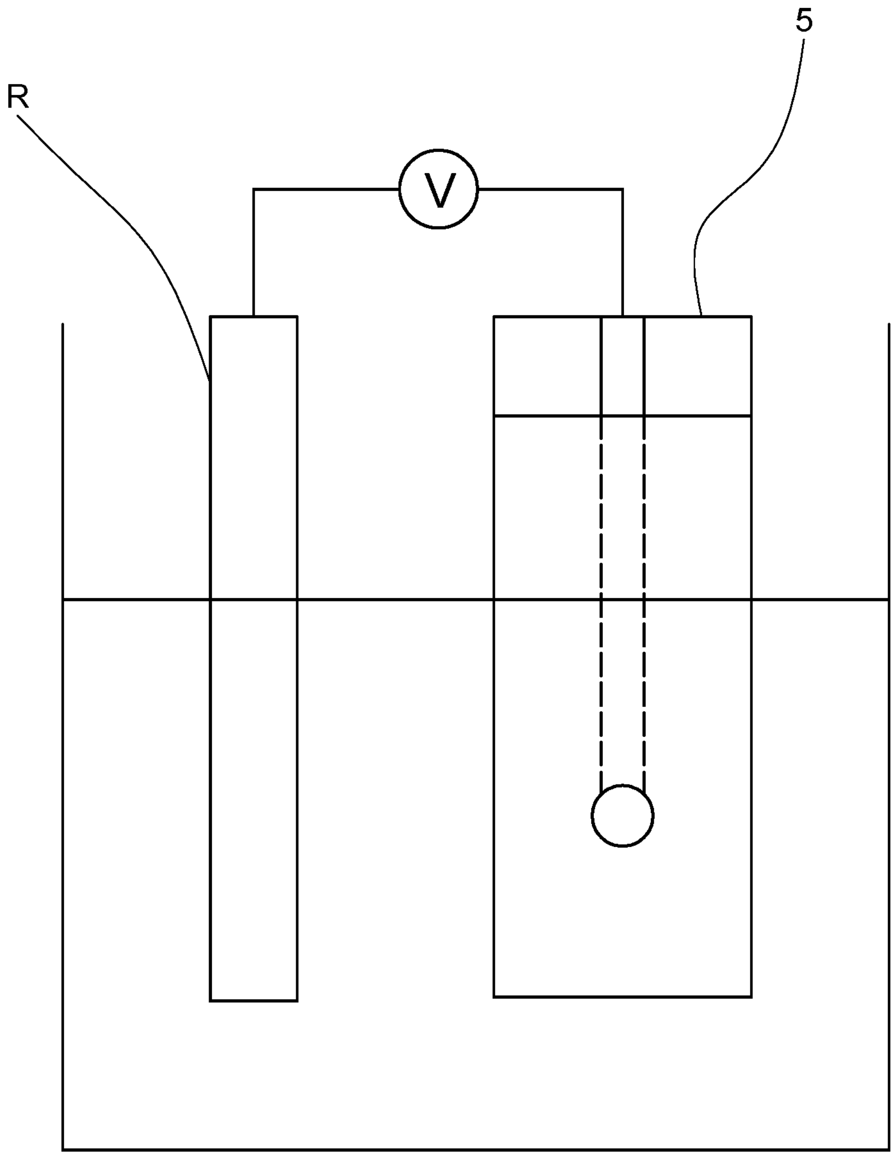
FIG. 4 is a schematic diagram illustrating a usage mode of the comparison electrode according to the present example.

Further, the card sensor 5 with Sample B-2 or C-1 applied and cured was used together with a double junction type comparison electrode R (2565 A-10T, HORIBA, Ltd.) as illustrated in FIG. 4 and was immersed in pH 7, pH 4, and pH 9 buffer solutions for 3 minutes each in this order, a temporal change of the potential was recorded, and a liquid junction potential was calculated from the potential at 3 minutes after the card sensor 5 was immersed in each solution.

As a result, as for the card sensor 5 with C-1, the liquid junction potential obtained from the potentials in the case of immersing the card sensor 5 in each of the pH 7, pH 4 and pH 9 buffer solutions and the 0.2 mol/L aqueous KCl solution and comparing the potentials with each other was within ±5 mV.

The card sensor with B-2 also exhibited a liquid junction potential difference comparable to that of the card sensor with C-1 described above.

From these results, it was found that the card sensor 5 containing the ionic-liquid-containing polymer 4 as a salt bridge can be sufficiently used as a comparison electrode.

INDUSTRIAL APPLICABILITY

It is possible to provide an ionic-liquid-containing polymer capable of further downsizing a comparison electrode or the like and further improving the degree of freedom in design while reducing the manufacturing cost.

The invention claimed is:

1. A comparison electrode comprising:

an internal electrode;

an ionic-liquid-containing polymer used as a salt bridge; and an ion-electron conversion layer between the salt bridge and the internal electrode, wherein the ionic-liquid-containing polymer comprises:

a fluorine atom-containing adhesive; and a hydrophobic ionic liquid, the fluorine atom-containing adhesive is a synthetic resin adhesive selected from the group consisting of acrylic adhesive, olefin adhesive, urethane adhesive, silicone adhesive, vinyl chloride adhesive, epoxy adhesive, polyamide adhesive, polyimide adhesive, and combinations thereof, and the ion-electron conversion layer is entirely covered by the ionic-liquid-containing polymer that has adhesiveness, thereby adhering to the ion-electron conversion layer without use of a separate adhesive or fastener.

2. The comparison electrode according to claim 1, wherein the fluorine atom-containing adhesive is an epoxy-based or silicon-based synthetic resin-based adhesive.

3. The comparison electrode according to claim 1, wherein the ionic-liquid-containing polymer is manufactured by mixing and drying the fluorine atom-containing adhesive and the hydrophobic ionic liquid.

4. The comparison electrode according to claim 1, wherein the ion-electron conversion layer contains one or more substances selected from the group consisting of carbon nanotubes, graphene, and graphite.

5. An electrochemical measurement device comprising the comparison electrode according to claim 1.

6. The comparison electrode according to claim 1, wherein the ionic-liquid-containing polymer is arranged to cover an entire surface of the ion-electron conversion layer that is in contact with a sample solution.

7. The comparison electrode according to claim 1, wherein the ion-electron conversion layer covers an entire surface of the internal electrode, and an entire surface of the ion-electron conversion layer is covered with the ionic-liquid-containing polymer.

* * * * *